United States Patent
Duphorne

(10) Patent No.: US 10,024,146 B2
(45) Date of Patent: Jul. 17, 2018

(54) SYSTEM AND METHOD FOR REDUCTION OF AN EFFECT OF A TUBE WAVE

(71) Applicant: Darin H. Duphorne, Houston, TX (US)

(72) Inventor: Darin H. Duphorne, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 461 days.

(21) Appl. No.: 14/230,399

(22) Filed: Mar. 31, 2014

(65) Prior Publication Data

US 2014/0209319 A1 Jul. 31, 2014

Related U.S. Application Data

(63) Continuation of application No. 13/209,065, filed on Aug. 12, 2011, now abandoned.

(51) Int. Cl.
| | |
|---|---|
| *E21B 43/12* | (2006.01) |
| *E21B 41/00* | (2006.01) |
| *F16L 55/054* | (2006.01) |
| *F16L 55/033* | (2006.01) |
| *F16L 55/04* | (2006.01) |

(52) U.S. Cl.
CPC ............. *E21B 43/12* (2013.01); *E21B 41/00* (2013.01); *F16L 55/0337* (2013.01); *F16L 55/043* (2013.01); *F16L 55/054* (2013.01)

(58) Field of Classification Search
CPC .......... E21B 43/12; E21B 41/00; E21B 43/00; F16L 55/043; F16L 55/0337; F16L 55/054; G10K 11/162
See application file for complete search history.

(56) References Cited

U.S. PATENT DOCUMENTS

| | | | |
|---|---|---|---|
| 1,629,018 A | * | 5/1927 | Coberly ................ E21B 43/086 |
| | | | 166/229 |
| 1,861,775 A | | 7/1932 | Aseltine |
| 2,196,993 A | | 4/1940 | Kidder |
| 2,251,880 A | | 8/1941 | Beecher et al. |
| 2,495,693 A | | 1/1950 | Byrd et al. |
| 2,609,001 A | | 9/1952 | Hebard |
| 2,712,831 A | | 7/1955 | Day |

(Continued)

FOREIGN PATENT DOCUMENTS

| | | |
|---|---|---|
| JP | 60247005 A | 12/1985 |
| JP | 061446844 A | 5/1994 |

OTHER PUBLICATIONS

Gillessen, R. and H. Lange, "Water hammer production and design measures in piping systems ," International Journal of Pressure Vessels and Piping, vol. 33, Issue 3, 1988, pp. 219-234.

(Continued)

*Primary Examiner* — D. Andrews
*Assistant Examiner* — Kristyn A Hall
(74) *Attorney, Agent, or Firm* — Cantor Colburn LLP

(57) ABSTRACT

A tube wave reduction system for a borehole includes a tubular member; one or more openings in the tubular member, the one or more openings having a through-passage and a deformation region surrounding the through-passage; and an absorber in fluid communication with the one or more openings. Also included is a method for reducing an effect of a tube wave.

20 Claims, 4 Drawing Sheets

(56) References Cited

U.S. PATENT DOCUMENTS

| | | |
|---|---|---|
| 2,841,180 A | 7/1958 | Pier |
| 2,841,181 A | 7/1958 | Hewitt et al. |
| 2,854,029 A | 9/1958 | Poore |
| 2,875,787 A | 3/1959 | Evans |
| 2,875,788 A | 3/1959 | Pier |
| 2,896,667 A | 7/1959 | Jumba |
| 3,310,114 A | 3/1967 | Dollison |
| 3,903,928 A | 9/1975 | Sykes et al. |
| 4,109,753 A | 8/1978 | Lyman |
| 4,184,565 A | 1/1980 | Price et al. |
| 4,234,054 A | 11/1980 | Chapin |
| 4,239,091 A | 12/1980 | Negrao |
| 4,523,662 A | 6/1985 | Tanaka et al. |
| 4,580,656 A | 4/1986 | Fukuda |
| 4,589,517 A | 5/1986 | Fukuda |
| 4,598,737 A | 7/1986 | Bentley |
| 4,610,369 A | 9/1986 | Mercier |
| 4,742,496 A | 5/1988 | Jennings, Jr. et al. |
| 4,846,273 A | 7/1989 | Anderson et al. |
| 4,936,383 A | 6/1990 | Towner et al. |
| 5,810,566 A | 9/1998 | Pauwels |
| 5,821,473 A | 10/1998 | Takahashi |
| 5,892,186 A | 4/1999 | Flugger |
| 6,131,613 A | 10/2000 | Jenski, Jr. et al. |
| 6,328,071 B1 | 12/2001 | Austin |
| 6,857,502 B2 | 2/2005 | Naito |
| 7,159,692 B1 | 1/2007 | Frederiksen et al. |
| 7,246,659 B2 | 7/2007 | Fripp et al. |
| 7,318,471 B2 | 1/2008 | Rodney et al. |
| 7,380,397 B2 | 6/2008 | Chang |
| 7,444,806 B2 | 11/2008 | Werber et al. |
| 7,448,469 B2 | 11/2008 | Seyler et al. |
| 7,743,825 B2 | 6/2010 | O'Malley et al. |
| 2005/0247411 A1 | 11/2005 | Shim |
| 2006/0283660 A1 | 12/2006 | Cai et al. |
| 2008/0073145 A1 | 3/2008 | Nakamura et al. |
| 2008/0196881 A1* | 8/2008 | Telfer .................. E21B 37/00 166/70 |
| 2008/0196898 A1 | 8/2008 | Jasser et al. |
| 2008/0314679 A1 | 12/2008 | Rowe et al. |
| 2009/0242206 A1 | 10/2009 | Goughnour et al. |
| 2011/0247801 A1 | 10/2011 | O'Malley et al. |
| 2012/0090830 A1 | 4/2012 | O'Malley et al. |
| 2013/0032431 A1* | 2/2013 | Bussear .................. F16L 55/05 181/196 |

OTHER PUBLICATIONS

Jianning et al. "Design of the Downhole Pulsation Dampener in the Rod Well System of High Pumping Rate and Forced Fluid Withdrawal," Oil Field Equipment, vol. 27 Issue 1, 1998, 5 pages.

Svinos, J. G. "Use of Downhole Pulsation Dampener to Eliminate the Effect of Fluid Inertia on a Rod Pump System," SPE California Regional Meeting, Apr. 5-7, 1989, Bakersfield, California.

Vaziri et al. "Computation of Sand Production in Water Injectors," European Formation Damage Conference, May 30-Jun. 1, 2007, Scheveningen, The Netherlands.

Wang et al. "Water Hammer Effects on Water Injection Well Performance and Longevity," 2008 SPE International Symposium and Exhibition on Formation Damage Control held in Lafayette, Louisiana, U.S.A., Feb. 13-15, 2008.

\* cited by examiner

US 10,024,146 B2

SYSTEM AND METHOD FOR REDUCTION OF AN EFFECT OF A TUBE WAVE

CROSS REFERENCE TO RELATED APPLICATIONS

This application is a continuation of U.S. Non Provisional application Ser. No. 13/209,065 filed Aug. 12, 2011, the entire disclosure of which is incorporated herein by reference.

BACKGROUND

In the drilling and completion arts, and indeed in all arts where flowing fluid is occasionally interrupted by a quickly closing valve, tube waves exist. Those of skill in arts associated with fluid flow are familiar with tube waves, known otherwise as "Stoneley waves" and in the vernacular as "water hammer". These waves can range from low magnitude inconsequential forms to astoundingly high magnitude destructive forms characterized by hundreds to thousands of PSI pressure spikes.

A number of factors influence the amplitude, frequency and duration of tube waves. Some important factors are velocity and specific gravity of the moving fluid as well as the rapidity with which the flowing fluid is subjected to change in rate of flow. Each of these will affect how energetic and therefore destructive the tube wave will be. In downhole arts, in both injection and production systems, tube waves can be very significant with respect to equipment and formation face damage and therefore are a concern for operators. The art, then, would be very receptive to systems and methods capable of reducing, dampening, alleviating or eliminating tube waves.

SUMMARY

A tube wave reduction system for a borehole includes a tubular member; one or more openings in the tubular member, the one or more openings having a through-passage and a deformation region surrounding the through-passage; and an absorber in fluid communication with the one or more openings.

A tube wave reduction system includes a tubular member; and one or more openings in the tubular member, the openings having a through-passage and a deformation region about the through-passage.

A method for reducing an effect of a tube wave includes burping at least pressure from a tube wave through one or more openings in a tubular member through which the tube wave propagates; and absorbing energy from the tube wave thereby reducing a magnitude of the tube wave.

BRIEF DESCRIPTION OF THE DRAWINGS

Referring now to the drawings wherein like elements are numbered alike in the several Figures.

DETAILED DESCRIPTION

Figure 1:
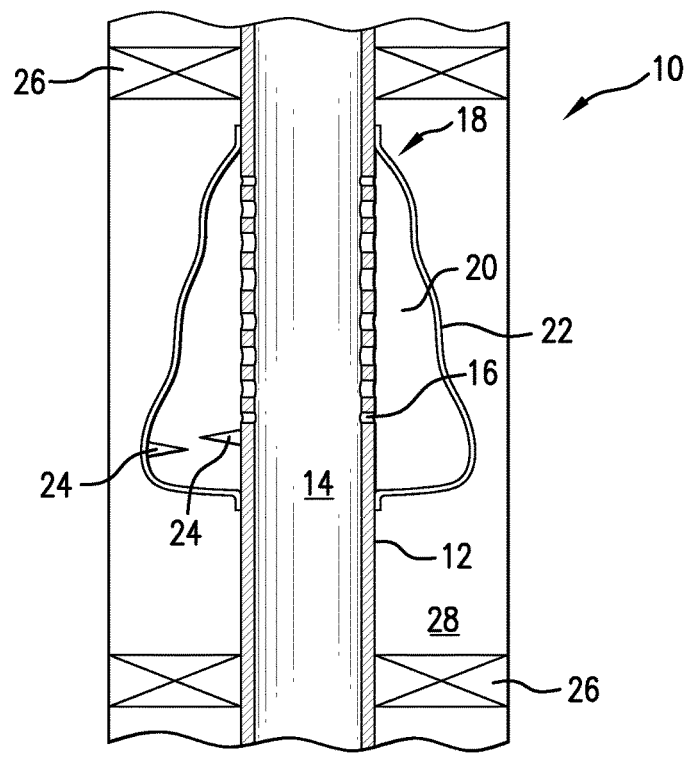
FIG. 1 is a schematic view of a tube wave reducing system.

Referring to FIG. 1, a system 10 is illustrated that will reduce, mitigate, dampen, alleviate or eliminate tube waves by absorption. The mechanisms of absorption predominantly used in the following embodiments are friction and work. The system 10 comprises a section of tubular member 12 having an axial flow channel 14 defined by the tubular member 12 and one or more openings 16 whose axes are oriented to intersect the channel 14. The member may be a housing of its own or other stub member or may simply be a modified joint of tubing string. In one embodiment the openings will be radially oriented and in others the openings may be angularly oriented relative to the channel 14 or where more than one opening is used, combinations of radial and angular (both illustrated in FIG. 1) relative to the axial flow channel 14 may be used. The one or more openings 16 may be rounded (circular, oval, etc.) in cross section or may be slots (rectangular, square, etc.) in cross section or may be in any other geometric form for their cross sections. It is to be appreciated that the openings may be in a regular pattern, an irregular pattern, may be all of the same dimensions or may be of different dimensions from each other. Any combination of these attributes is also contemplated. Differing sizes of openings and different spacings of openings can be advantageous with respect to creating destructive interference in waveforms that are propagated through the openings.

In each embodiment, the openings 16 will lead from the channel 14 to an energy absorber 18. In the embodiment of FIG. 1, the energy absorber may be changeable in volume while in FIG. 2, the absorber is a high-friction flow-through material such as an open cell foam. By absorbing and dissipating the energy of the tube wave, the wave itself is reduced to a level where significant damage is not likely to occur to at least the component or formation portion that it is desired to protect. In some cases the wave can be completely eliminated. It will be appreciated however that complete elimination is not critical but rather that mitigation of the wave to a level where components of the downhole system and/or the formation itself would not be damaged is all that is needed for a fully successful endeavor to be realized.

Still referring to FIG. 1, one embodiment employs a configuration where the absorber is configured as a chamber 20 in fluid connection with the one or more openings 16. The chamber can change its volume in response to a change in pressure thereby enabling the chamber to absorb the pressure spike of a tube wave. Reduction of the energy of the tube wave is the result.

The chamber 20 is defined by a flexible material 22 connected to the tubular member 12 that may be a monomeric or polymeric material or may be another type of material such as metal providing that it has flexibility sufficient to allow the chamber it defines to expand in volume. In the case of a metal, one embodiment would be a metal bellows 22a (see FIG. 2) type configuration so that a change in internal volume of the chamber 20 is possible.

The material 22 may be elastic or inelastic. Elastic materials will absorb the pressure spike through elastic deformation as well as through friction and destructive wave reflection interference. Where the material is not elastic it must be loose enough to generally gather about the one or more openings 16 such that it is able to change volume as noted above. In the case of the material being inelastic or substantially inelastic, the pressure spike inherent in the tube wave will simply be absorbed through the work necessary to produce movement of the inelastic material 22 itself. Without an elastic property or in cases where an elastic property exists but the change in volume of the chamber defined by the material is less than that required to elastically deform the material, the energy of the tube wave effectively dies in the friction presented by the flow of fluid into the chamber and the work required to inflate the chamber 20.

Figure 2:
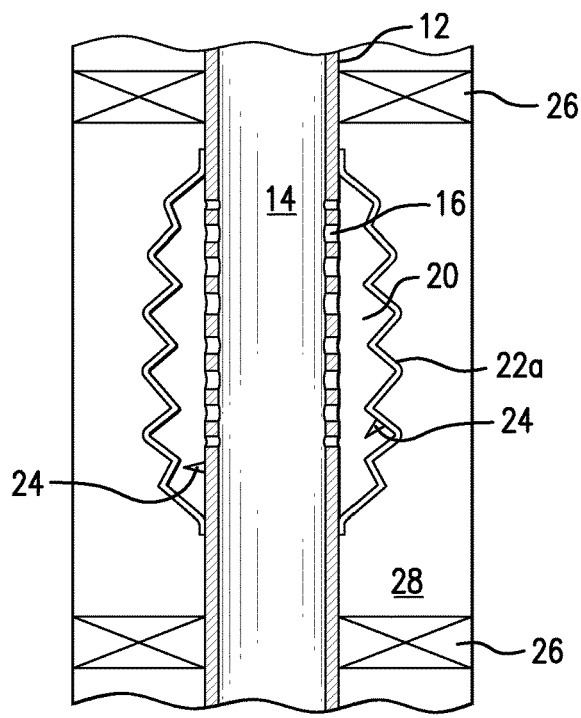
FIG. 2 is a schematic view of an alternate tube wave reducing system.

In some embodiments configured generally as illustrated in FIG. 1 or 2, the material and chamber defined thereby function alone to reduce the tube wave but in other embodiments, one or more obstructions 24 such as baffles, etc. (also illustrated in FIGS. 1 and 2) can be added in the chamber area to cause fluid to travel in a tortuous path thereby causing it to lose more energy. The obstructions may be a part of the material 22 or attached to an outside of the member 12 within the area bounded by the material 22 or both. In each case, the propagating wave front from the tube wave will encounter these obstructions 24 experiencing friction and in some instances reflect a part of the waveform causing destructive wave interference.

For each of the embodiments disclosed herein an option is to include within the downhole system an isolation device such as an isolation packer or seal 26 within the annulus 28 toward which the pressure is propagated through the one or more openings 16. The placement of the isolation packer or seal 26 would be within the annulus between the component or formation the operator wants to protect from the pressure spike and the location of the one or more openings 16. It is also contemplated that two packers or seals 26 might be employed in the annulus 28, one uphole and one downhole of the one or more openings 16. It is noted that the greater the distance between packers 26 in a two packer system, the larger the pressure spike that can be absorbed. Hence, packers should be placed as far as is convenient from the openings 16 in some embodiments while still being between those openings 16 and the feature that is to be the subject of protection.

Figure 3:
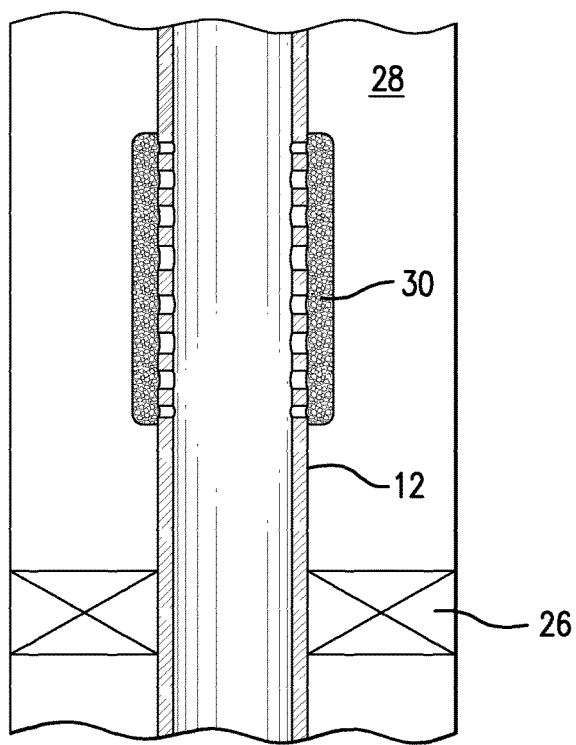
FIG. 3 is a schematic view of another alternate tube wave reducing system.
Figure 4:
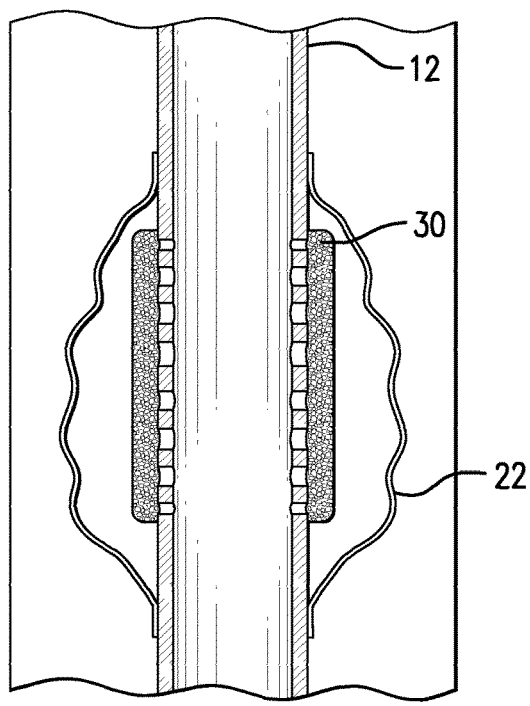
FIG. 4 is a schematic view of another alternate tube wave reducing system.

Referring to FIG. 3, the absorber 18 is configured as high-friction flow-through material 30 such as an open cell foam. The absorber is positioned against the tubular member 12 as illustrated. In this embodiment, the axial flow fluid is not physically separated from the annulus but rather is allowed to move into the annulus through the absorber 18. The friction of the fluid moving through the absorber effectively dissipates the energy of the pressure spike of the tube wave. In another related embodiment, the material 30 is placed within a material 22 (see FIG. 4) to provide for even more energy absorption and additionally physical fluid segregation.

Figure 5:
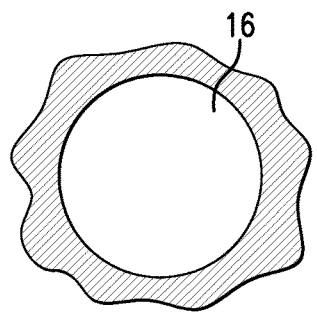
FIG. 5 is a representative cross section of the one or more openings as disclosed herein.
Figure 6:
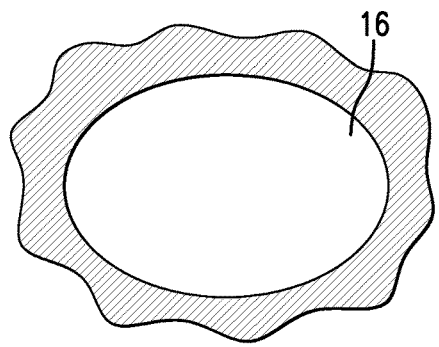
FIG. 6 is an alternate representative cross section of the one or more openings as disclosed herein.
Figure 7:
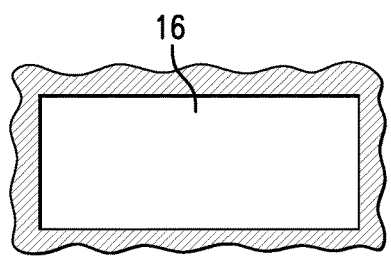
FIG. 7 is another alternate representative cross section of the one or more openings as disclosed herein.
Figure 8:
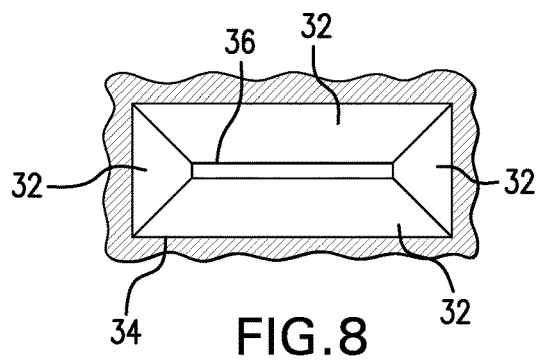
FIG. 8 is another alternate representative cross section of the one or more openings as disclosed herein

Referring to FIGS. 5-8, exemplary geometries of the one or more openings 16 are illustrated. FIG. 5 illustrates a circular geometry; FIG. 6 an oval geometry; FIG. 7 a rectangular geometry; and FIG. 8 a tapering rectangular geometry. It is stressed that these are merely examples. Further it is noted that other shapes may include lead in angles like that illustrated in FIG. 8 such as a frustoconical lead in if the cross sectional geometry is circular. Referring to FIG. 8, the lead in is identified as numeral 32, which extends from a larger side 34 of the opening 16 to a smaller other side 36 of the opening 16, which in this case is substantially a slit 36. Lead in embodiments may help encourage fluid movement out of the tubular 12.

Configured slightly differently, the lead in embodiments create a thinner wall thickness of the tubular 12 allowing the system to "burp". "Burp" and formatives thereof in this disclosure refer to a pressure buildup on one side of a structure that is configured to deform under that enhanced pressure and release the pressure build up. The opening size returns to a low pressure configuration after pressure has begun to equalize. This is better described in connection with FIG. 10 hereunder. It is further to be understood that the burping concept can function on its own, venting to the annulus 28, or can vent to a microannulus or can vent to a chamber like the chambers identified as 20 above.

Figure 9:
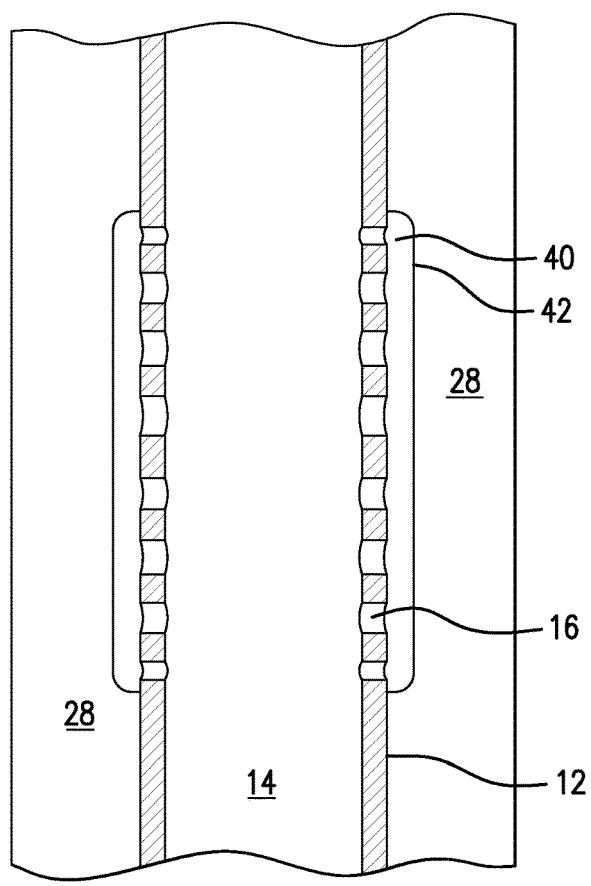
FIG. 9 is a schematic view of another alternate tube wave reducing system.

Referring to FIG. 9, a microannulus 40 can be created by attaching a tubular 42 to the OD of the tubular 12 leaving the microannulus 40 between the tubular member 12 and the additional tubular 42. In each of these configurations the concept itself remains a "burp" concept wherein the tubular member 12 is supplied with one or more openings 116 (see FIG. 10) that themselves are configured to maintain a relatively small through-passage at ambient pressures and change to a larger through-passage when a pressure spike is encountered such as when a tube wave arrives at the location of the tubular member 12. Upon encountering the higher pressure, the one or more openings will deform for the duration of time that the pressure differential thereacross is high. The "burp" will be at least fluid pressure and generally will include fluid into the annulus or microannulus or chamber.

Figure 10:
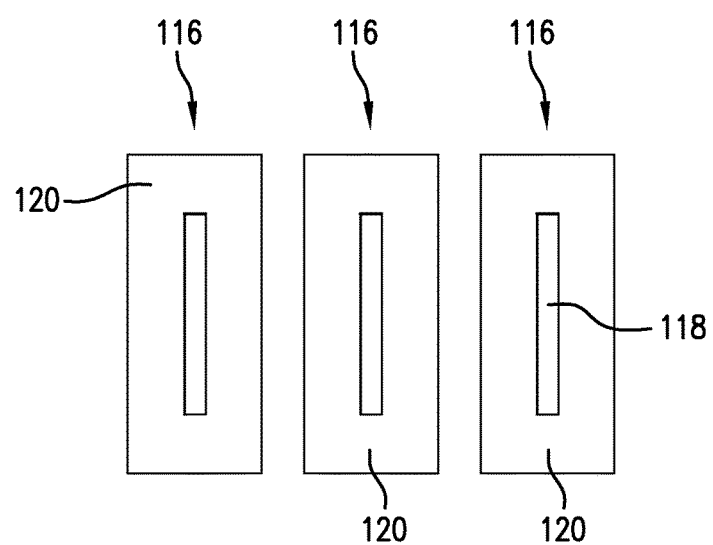
FIG. 10 is a schematic representation of three openings configured to burp as disclosed herein.

Referring to FIG. 10, a schematic representation of the burping openings is provided. It is to be understood that merely three of the openings are illustrated. More or fewer are contemplated in any desired pattern as desired. The openings 116 comprise through-passages 118 that may be created via laser cutting, plasma cutting, traditional or electric discharge machining, etc. and are relatively small so that fluid at ambient pressure is not significantly exhausted through those passages. At elevated pressure however, as is experienced in the inside of the tubular 12 during a tube wave event, the openings 116 deform slightly to produce a larger through-passage 118 to "burp" fluid or at least pressure therethrough. Enabling the deformation capability is a deformation region 120 (which may or may not appear like the lead in area 32 of FIG. 8) about the through passages 118 that exhibits a sufficient resilience to allow the deformation. In one embodiment the region 120 comprises an area of thinner material of the tubular 12. This is accomplished in some embodiments by gradually thinning the material of the tubular member 12 as proximity to the through passage 118 increases. In other embodiments the material of tubular 12 might be modified in the regions 120 by changing the material entirely such as by substituting all or part of the thickness of the tubular member 12 in regions 120 with a different material such as rubber or the like. Such material will be selected to have greater flexibility than the material of tubular 12 and sufficient flexibility to enable the burping action desired for function of this embodiment.

Each of the embodiments described in this disclosure are described as singular entities but it is to be appreciated that systems can comprise multiple iterations of the described entities. Further, in systems where multiple entities are used, they can each be of the same type or they can be different types of the above described embodiments.

It is to be appreciated that configurations in accordance with the teaching herein offer no restriction to normal axial flow through the tubular member 12 nor any impediment to running of tools therethrough, each of which is advantageous to a downhole drilling and completions operator.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A tube wave reduction system for a borehole comprising:
   a tubular member comprising a wall and an open inside diameter that offers no restriction to axial flow therethrough and has a structure conducive to propagation of a tube wave;
   one or more openings in the wall of the tubular member, the one or more openings being configured to maintain a relatively smaller through-passage at ambient pressures and change to a relatively larger through passage responsive to a pressure higher within the tubular member than without the tubular member when a tube wave arrives at the one or more openings during use; and
   a deformation region of the wall of the tubular member adjacent one or more through-passages of the one or more openings, the deformation region being configured to deform in response to the arrival of the tube wave to facilitate the relatively larger through-passage and resiliently return to the relatively smaller through-passage after dissipation of the tube wave.

2. A tube wave reduction system as claimed in claim 1 wherein the deformation region tapers to a thin walled section of the tubular member adjacent an opening of the one or more openings.

3. A tube wave reduction system as claimed in claim 1 wherein the deformation region is a material difference of the tubular member.

4. A tube wave reduction system as claimed in claim 1 wherein the deformation region is an elastomer.

5. A tube wave reduction system as claimed in claim 1 wherein the deformation region includes a lead in configuration.

6. A tube wave reduction system as claimed in claim 1 wherein the system passes fluid axially during ambient pressure operation and passes at least fluid pressure radially during pressure events exceeding ambient pressure for the system.

7. A tube wave reduction system as claimed in claim 1 wherein the system further includes an absorber.

8. A tube wave reduction system as claimed in claim 7 wherein the absorber is an elastic material.

9. A tube wave reduction system as claimed in claim 7 wherein the absorber is an inelastic material.

10. A tube wave reduction system as claimed in claim 7 wherein the absorber is loosely disposed about the one or more openings.

11. A tube wave reduction system as claimed in claim 7 wherein the absorber defines with the tubular member a chamber.

12. A tube wave reduction system as claimed in claim 7 wherein the absorber is a metal bellows.

13. A tube wave reduction system as claimed in claim 7 wherein the absorber comprises a high-friction flow-through material.

14. A tube wave reduction system as claimed in claim 13 wherein the high-friction flow-through material is foam.

15. A tube wave reduction system as claimed in claim 13 wherein the absorber further comprises a material radially outwardly of the high-friction flow through-material.

16. A tube wave reduction system as claimed in claim 1 wherein one or more openings are radially oriented.

17. A tube wave reduction system as claimed in claim 1 wherein the system includes a microannulus in fluid communication with the one or more openings.

18. A method for protecting equipment comprising:
    containing fluid within the system claimed in claim 1;
    burping at least pressure from a tube wave occurring within the system through the one or more openings in the tubular member by deforming the deformation region adjacent the one or more through-passages of the one or more openings to change the through-passages from the relatively small through-passage to the larger through-passage in response to the arrival of the tube wave wherein a pressure spike attendant the tube wave facilitates deformation of the deformation region to the relatively larger through-passage;
    absorbing energy from the tube wave by conveying pressure from the tube wave through the one or more openings thereby reducing a magnitude of the tube wave, and
    resiliently returning the deformation region to the relatively smaller through-passage after the absorbing of the tube wave; and
    reducing an effect of the tube wave propagating along the tubular member.

19. A method for reducing an effect of a tube wave as claimed in claim 18 wherein the absorbing includes expanding a material in fluid communication with the one or more openings, the material defining a chamber with the tubular member.

20. A method for reducing an effect of a tube wave as claimed in claim 18 wherein the absorbing includes flowing fluid through a high-friction flow-through material in fluid communication with the one or more openings.

* * * * *